(12) United States Patent
Noguchi et al.

(10) Patent No.: US 8,037,956 B2
(45) Date of Patent: Oct. 18, 2011

(54) VEHICLE MOUNTED WITH FUEL CELL POWER SUPPLY SYSTEM

(75) Inventors: Minoru Noguchi, Wako (JP); Mitsuaki Hirakawa, Wako (JP); Takeshi Fujino, Wako (JP); Eisuke Komazawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 372 days.

(21) Appl. No.: 12/292,734

(22) Filed: Nov. 25, 2008

(65) Prior Publication Data

US 2009/0133943 A1 May 28, 2009

(30) Foreign Application Priority Data

Nov. 27, 2007 (JP) .................................. 2007-305900

(51) Int. Cl.
*B60K 1/00* (2006.01)
(52) U.S. Cl. .................... 180/65.31; 180/68.1; 180/68.2
(58) Field of Classification Search .............. 180/65.31, 180/229, 68.4, 68.1, 68.2, 68.3, 65.21; 429/428, 429/432, 430, 414, 436, 13, 435
See application file for complete search history.

(56) References Cited

U.S. PATENT DOCUMENTS

| | | | | |
|---|---|---|---|---|
| 6,973,393 B2 * | 12/2005 | Hasuka et al. | ................... | 702/63 |
| 7,195,830 B2 * | 3/2007 | Kobayashi et al. | ........... | 429/436 |
| 7,300,717 B2 * | 11/2007 | Toukura | ......................... | 429/430 |
| 7,358,003 B2 * | 4/2008 | Imaseki et al. | ................. | 429/435 |
| 7,455,920 B2 * | 11/2008 | Sakai | ........................... | 429/414 |
| 7,462,414 B2 * | 12/2008 | Sakajo et al. | .................. | 429/465 |
| 7,527,885 B2 * | 5/2009 | Toukura | ......................... | 429/430 |
| 7,771,856 B2 * | 8/2010 | Yoshida et al. | ................ | 429/432 |
| 7,816,045 B2 * | 10/2010 | Oishi et al. | ...................... | 429/428 |
| 2007/0141418 A1 * | 6/2007 | Ota et al. | .......................... | 429/24 |
| 2007/0243427 A1 * | 10/2007 | Hayashi et al. | .................. | 429/13 |
| 2008/0088043 A1 * | 4/2008 | Daisuke | ......................... | 261/130 |
| 2009/0004518 A1 * | 1/2009 | Fujita | .............................. | 429/24 |
| 2009/0038867 A1 * | 2/2009 | Jufuku et al. | .............. | 180/65.31 |
| 2009/0148727 A1 * | 6/2009 | Taniguchi et al. | .............. | 429/13 |

FOREIGN PATENT DOCUMENTS

| | | |
|---|---|---|
| JP | 2001-138976 A | 5/2001 |
| JP | 2002-187435 A | 7/2002 |
| JP | 2003-136970 A | 5/2003 |
| JP | 2006-142924 A | 6/2006 |
| JP | 2007-186200 | 7/2007 |
| WO | 2007/043691 A1 | 4/2007 |

* cited by examiner

*Primary Examiner* — Hau Phan
(74) *Attorney, Agent, or Firm* — Squire, Sanders & Dempsey (US) LLP (57) ABSTRACT

A vehicle is described that can efficiently cool or heat a group of components, in view of appropriate operating temperature ranges of respective components configuring a fuel cell power supply system, while realizing saving of a mounting space in the vehicle and cost of the vehicle. The vehicle mounted with a fuel cell power supply system includes at least a fuel cell, and an accumulating unit includes a capacitor and a secondary battery connected to the fuel cell. A motor serves as a power source for the vehicle to which output sections of the fuel cell and the accumulating unit are connected. A PDU provided between the output sections and the motor. A component group of the power supply system, including the fuel cell, the accumulating unit, and the PDU, is cooled by a cooling medium which flows inside the vehicle, in order from one having a lowest heating generation amount.

8 Claims, 6 Drawing Sheets

VEHICLE MOUNTED WITH FUEL CELL POWER SUPPLY SYSTEM

BACKGROUND OF THE INVENTION

1. Field of the Invention

The present invention relates to a vehicle mounted with a fuel cell power supply system comprising a fuel cell, a capacitor, and a secondary battery.

2. Description of the Related Art

Figure 2:
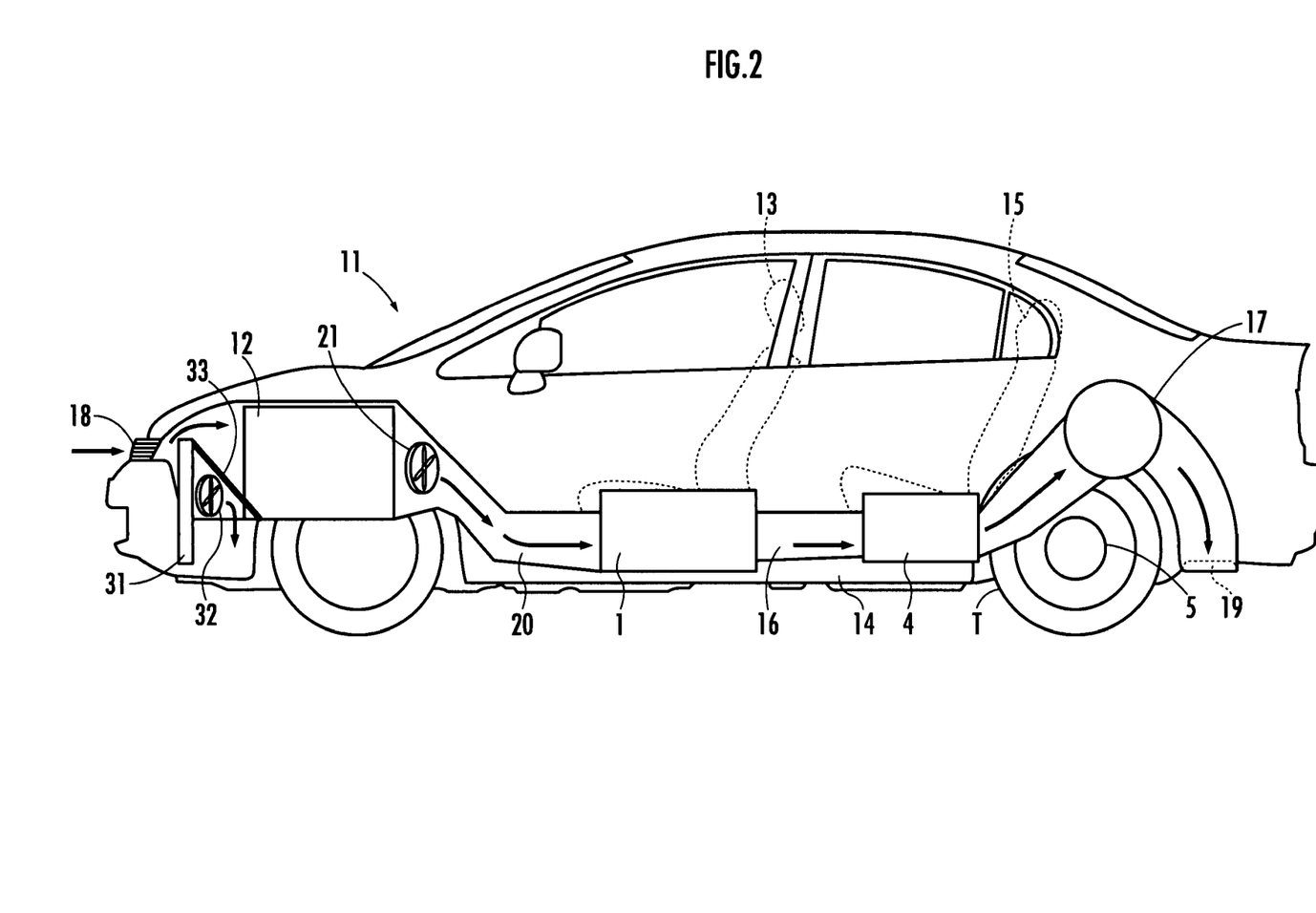
FIG. 2 is a partial sectional view of a fuel cell vehicle according to the embodiment viewed from a side.

Conventionally, as the vehicle mounted with this type of fuel cell power supply system, there is known a vehicle in which, as shown in FIG. 2 of Japanese Patent Laid-Open No. 2007-186200, fuel cells are arranged to be aggregated in an area below a front seat and accumulating means (secondary batteries) are arranged to be aggregated in an area below a rear seat.

In such a conventional vehicle, rated temperature (upper limit operating temperature) of the fuel cells and rated temperature of the accumulating means are different (e.g., equal to or lower than 60° C. for the secondary batteries and about 80° C. for the fuel cells). Therefore, water cooling is performed for the fuel cells and air cooling is performed for the accumulating means.

However, in the conventional vehicle, the fuel cells and accumulating means are individually cooled by using independent cooling mechanisms. Therefore, there are problems that a mounting space for the cooling mechanisms in the vehicle is large and cost for the cooling mechanisms is high.

As described above, the components configuring the fuel cell power supply system have appropriate operating temperature ranges different from each other. When cooling or heating mechanisms for temperature adjustment are provided for the respective components, a space and cost for the temperature adjusting mechanisms increase.

SUMMARY OF THE INVENTION

Therefore, it is an object of the present invention to provide a vehicle that can efficiently cool or heat, in view of appropriate operating temperature ranges of respective components configuring a fuel cell power supply system, a group of the components while realizing saving of a mounting space in the vehicle and cost of the vehicle.

In order to attain the object, the present invention provides a vehicle mounted with a fuel cell power supply system comprising at least a fuel cell, accumulating means including one or both of a capacitor and a secondary battery connected to the fuel cell, a motor serving as a power source for the vehicle to which output sections of the fuel cell and the accumulating means are connected, and a motor driving device provided between the output sections and the motor, wherein a first component group including the fuel cell, the accumulating means, and the motor driving device is arranged to be cooled by a cooling medium, which flows inside the vehicle, in order from one having a smallest heating generation amount (a first invention).

According to such a first invention, the first component group, which have heating generation amounts, including the fuel cell is cooled preferentially from the component having a smallest heating generation amount. Therefore, even if the cooling medium is heated by the component cooled earlier, since a heating generation amount of the component to be cooled next is larger, it is possible to cool the next component using the heated cooling medium.

In other words, the component having a larger heating generation amount is cooled later. Therefore, it is possible to efficiently cool the component group using the cooling medium by preventing the cooling medium from being heated on a front side to the extent that it is unable to cool the component arranged in the rear.

All the components of the first component group can be cooled in order by a common cooling medium. Therefore, it is unnecessary to provide individual cooling mechanisms for the respective components and thereby it is possible to realize saving of a space for a cooling mechanism and the like in the vehicle and hold down cost for the cooling mechanism and the like.

In this way, with the vehicle according to the first invention, it is possible to efficiently cool, in view of appropriate operating temperature ranges of the respective components configuring the fuel cell power supply system, the group of the components while realizing saving of a mounting space and cost.

In the first invention, a second component group including a fuel tank for supplying fuel to the fuel cell is arranged downstream of the first component group in a flow of the cooling medium (a second invention).

According to such a second invention, the second component group, which needs to be heated, including the fuel tank is arranged downstream of the first component group. Therefore, it is possible to heat the second component group using the cooling medium heated by the first component group. Consequently, it is possible to efficiently heat, in view of appropriate operating temperature ranges of second components, the components while saving a space and cost for mounting a heating mechanism.

In the first invention, the cooling medium is the air flowing in an internal space in which the first component group is arranged and the internal space includes an inlet section for causing the air outside the vehicle to flow into the internal space when the vehicle runs and an outlet section for causing the inflow air to flow out of the internal space (a third invention).

According to such a third invention, the first component group is arranged in the internal space in which the inflow air flows during movement of the vehicle. Since the inflow air is used as a cooling medium, it is unnecessary to prepare a special cooling medium and it is possible to efficiently cool these components with a simple configuration including the inlet section, the outlet section, and the internal space formed between the inlet section and the outlet section.

In the third invention, a second component group including a fuel tank for supplying fuel to the fuel cell is arranged between the internal space and the outlet section (a fourth invention).

According to such a fourth invention, since the second component group, which needs to be heated, including the fuel tank is arranged between the internal space and the outlet section, it is possible to supply the inflow air heated by the first component group to the second component group and heat the second component group. Since the second component group is heated by using the inflow air heated by the first component group in this way, it is possible to save a space and cost for mounting a heating mechanism and efficiently heat the second component group with a simple configuration.

In the first invention, the cooling medium is coolant flowing through a circulation path provided in the vehicle and, in the circulation path, a heat radiating unit that radiates heat of the coolant is provided on a path leading from the component having a maximum heating generation amount to the component having a minimum heating generation amount (a fifth invention).

According to such a fifth invention, in the circulation path, the heat radiating unit is provided on the path leading from the component having a maximum heating generation amount to the component having a minimum heating generation amount. Therefore, it is possible to cool the components with the coolant cooled by the heat radiating unit in order from one having a smallest heating generation amount, prevent inconvenience in that the component arranged in the rear cannot be cooled, and efficiently cool the component group using a common circulation path.

In the fifth invention, the coolant as the cooling medium is circulated through the circulation path to cool the first component group. Therefore, even when cooling by the inflow air cannot be expected, for example, when the vehicle is stopped, it is possible to forcibly cool the component group by circulating the coolant through the circulation path.

In the fifth invention, the heat radiating unit includes a circulation path section, which circulates through the second component group, including a fuel tank for supplying fuel to the fuel cell (a sixth invention).

According to such a sixth invention, the circulation path is circulated through the second component group on a path leading from the component having a maximum heating generation amount to the component having a minimum heating generation amount to radiate the heat of the cooling medium to the second component group that needs to be heated. Consequently, it is possible to use the heat absorbed from the first component group for heating of the second component group and radiate the heat, save a space and cost for mounting a heating mechanism, and efficiently perform heat radiation of the cooling medium and heating of the second component group.

In the fifth invention, a temperature sensor for measuring the temperature of the coolant and a switching valve for switching an object to be cooled by the coolant to all or a part of the component group are provided in the circulation path and the switching valve is switched on the basis of measured temperature by the temperature sensor (a seventh invention).

According to such a seventh invention, it is possible to switch a supply destination of the coolant with switching means taking into account appropriate temperature ranges of the respective components. Therefore, it is possible to prevent a part of the component group from being excessively cooled or excessively heated. For example, when the vehicle is started, it is possible to prevent the cooling medium from circulating to the fuel cell before the temperature of the fuel cell reaches stable operating temperature. Further, when the temperature of the fuel cell reaches the stable operating temperature or higher temperature, it is possible to suppress a temperature rise of the fuel cell by circulating the cooling medium.

In the first to seventh inventions, the first component group only has to be arranged such that the components are cooled in order from one having a smallest heating generation amount. However, the fuel cell, the accumulating means, and the motor driving device are preferably arranged as explained below.

The fuel cell, the accumulating means, and the motor driving device are preferably arranged so as to be cooled in order of the accumulating means, the fuel cell, and the motor driving device by the cooling medium (an eighth invention).

According to such an eighth invention, in the component group, the accumulating means, the fuel cell, and the motor driving device have particularly large heating generation amounts and rated temperatures (upper limit operating temperatures) thereof are limited. The heating generation amounts and the rated temperatures of the accumulating means, the fuel cell, and the motor driving device increase in this order. Therefore, by cooling at least the accumulating means, the fuel cell, and the motor driving device in this order, it is possible to appropriately keep heat balance of the entire fuel cell power supply system using the cooling medium.

DETAILED DESCRIPTION OF THE PREFERRED EMBODIMENT

An embodiment of the present invention is explained below with reference to FIGS. 1 to 6.

Figure 1:
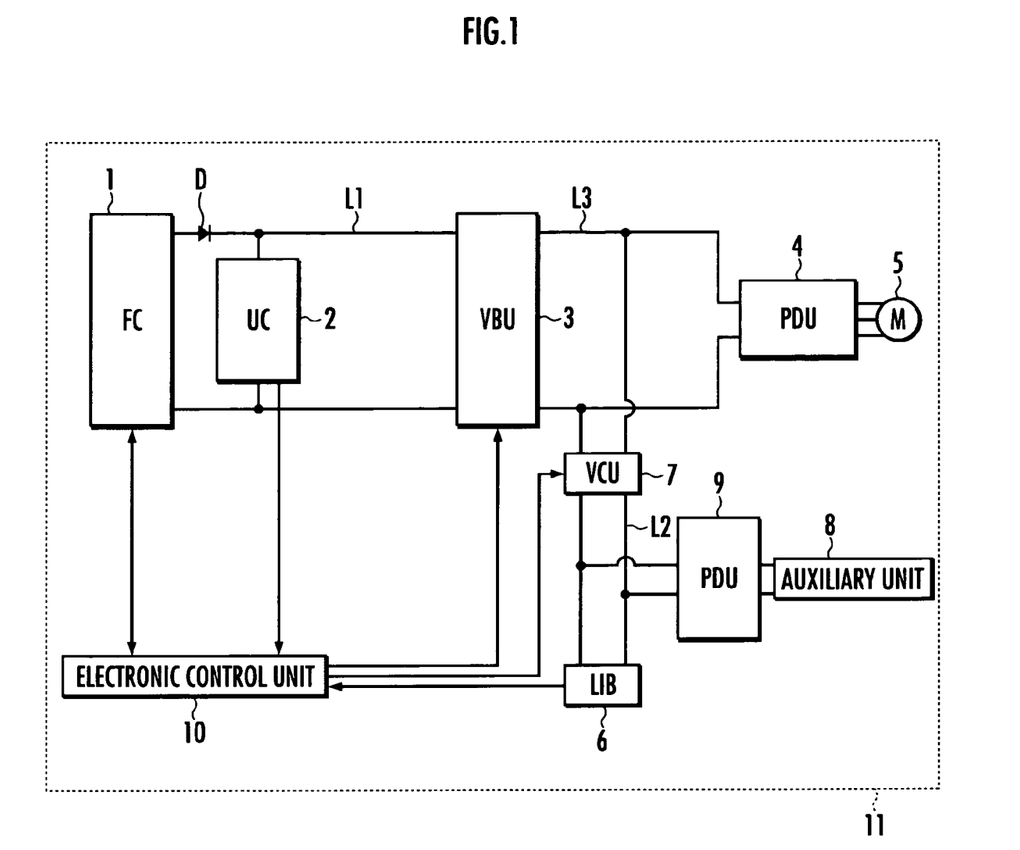
FIG. 1 is an overall diagram of a fuel cell power supply system according to an embodiment of the present invention.

FIG. 1 is an overall diagram of a fuel cell power supply system according to this embodiment. As shown in FIG. 1, the fuel cell power supply system as a power supply system according to this embodiment is mounted on a fuel cell vehicle 11 (equivalent to a vehicle of the present invention; hereinafter simply referred to as vehicle 11). The fuel cell power supply system comprises a fuel cell 1, an electrical double layer capacitor 2 (hereinafter simply referred to as capacitor 2) connected in parallel to the fuel cell 1, boosting means 3 (a voltage boost unit) whose input section is connected to the fuel cell 1 and the capacitor 2 and whose output section is connected to a motor 5 (equivalent to a load of the present invention) via a PDU 4 (power drive unit; equivalent to a motor driving device of the present invention), and voltage converting means 7 whose input section is connected to the boosting means 3 and whose output section is connected to a secondary battery 6 (in this embodiment, a lithium ion battery is used).

The fuel cell 1 is configured by connecting, for example, two-hundred fifty fuel cell stacks in series. An output voltage of the fuel cell 1 fluctuates in a range of about 225 V (an output current of 0 A) to 180 V (an output current of 210 A). The capacitor 2 includes not-shown plural capacitor cells. An output voltage of the capacitor 2 fluctuates in a range around 200 V (in a range of about a lower limit of 154 V to an upper limit of 243 V). The secondary battery 6 is a battery unit configured by connecting not-shown plural secondary batteries (lithium ion batteries) to one another. An output voltage of the secondary battery 6 fluctuates in a range of about 290 V to 350 V.

The boosting means 3 is, for example, a DC/DC converter having a step-up ratio of 1.5 to 2.4 at rated power of 100 kW. The boosting means 3 has at least a step-up function. A step-down function is added to the boosting means 3 when necessary. The voltage converting means 7 is, for example, a DC/DC converter having a step-up ratio of 1.36 to 1.70 at rated power of 10 kW.

The fuel cell power supply system further comprises an auxiliary unit 8 connected in parallel to the secondary battery 6 and the voltage converting means 7 between the secondary battery 6 and the voltage converting means 7. The auxiliary unit 8 is, for example, a pump that supplies a hydrogen gas stored in a hydrogen fuel tank 17 (see FIGS. 2 and 3; equivalent to a fuel tank of the present invention) to the fuel cell 1 via a regulator, various valves, and the like not shown in the figure or a circulating pump for circulating coolant serving as a cooling medium to a circulation path 30 explained later (see FIG. 3). The auxiliary unit 8 is connected to a second power supply line L2, which is directly connected to the secondary battery 6 and the voltage converting means 7, via a PDU 9 (power drive unit). In the fuel cell power supply system according to this embodiment, for convenience of explanation, a power supply line directly connected to the fuel cell 1 and the capacitor 2 is referred to as first power supply line L1, a power supply line directly connected to the secondary battery 6 and the voltage converting means 7 is referred to as second power supply line L2, and a power supply line having voltage obtained by boosting the voltage of the first power supply line L1 with the boosting means 3 is referred to as third power supply line L3.

The fuel cell power supply system includes an electronic control unit 10. The electronic control unit 10 acquires detection signals of voltage sensors and current sensors, which are not shown in the figure, provided in the fuel cell 1, the capacitor 2, and the secondary battery 6, respectively, and detects voltages, electric currents, electric powers output from the fuel cell 1, the capacitor 2, and the secondary battery 6.

The electronic control unit 10 estimates open-circuit voltage from the output voltage and the output current of the capacitor 2. The electronic control unit 10 estimates the SOC of the capacitor 2, referring to a map and a data table (hereinafter referred to as map and the like) in which a relation between the estimated open-circuit voltage and a state of charge (hereinafter referred to as SOC) of the capacitor 2 is defined. The electronic control unit 10 estimates the open-circuit voltage of the secondary battery 6 from the output voltage and the output current of the secondary battery 6. The electronic control unit 10 estimates an SOC of the secondary battery 6, referring to a map and the like in which a relation between the estimated open-circuit voltage and an SOC of the secondary battery 6 is defined.

The electronic control unit 10 executes, on the basis of the output of the fuel cell 1 and the respective SOCs of the capacitor 2 and the secondary battery 6, actuation control for the fuel cell 1 and actuation control for the boosting means 3 or the voltage converting means 7. The electronic control unit 10 performs power supply from the fuel cell 1, the capacitor 2, and the secondary battery 6 to the motor 5 and charging of the capacitor 2 and the secondary battery 6 from the fuel cell 1.

The motor 5 functions as a generator when the vehicle 11 slows down. Therefore, the electronic control unit 10 collects regenerated power generated by the motor 5 during the slowdown of the vehicle 11 and executes charging of the capacitor 2 and the secondary battery 6 with the regenerated power. At this point, the electronic control unit 10 detects, with a voltage sensor and a current sensor (not shown in the figure) provided in the PDU 4, the regenerated power of the motor 5, executes actuation control for the boosting means 3 or the voltage converting means 7, and performs charging from the motor 5 to the capacitor 2 and the secondary battery 6.

In the fuel cell power supply system according to this embodiment, a diode D is provided between the fuel cell 1, and the boosting means 3 and the capacitor 2. Inflow of an electric current into the fuel cell 1 is prohibited by the diode D. The inflow of an electric current into the fuel cell 1 may be prohibited by using another rectifying device such as a transistor instead of the diode D or connecting the capacitor 2 to the fuel cell 1 via step-down means (a down converter).

The overall configuration of the fuel cell power supply system according to this embodiment is as described above.

A layout of a component group configuring the fuel cell power supply system according to this embodiment including the fuel cell 1, the capacitor 2, the PDU 4, and the secondary battery 6 is explained below with reference to FIGS. 2 and 3.

FIG. 2 is a partial sectional view of the vehicle 11 viewed from a side. FIG. 3 is a partial sectional view of the vehicle 11 viewed from above. In FIGS. 2 and 3, the capacitor 2 and the secondary battery 6 are integrally housed in an accumulating unit 12.

Figure 3:
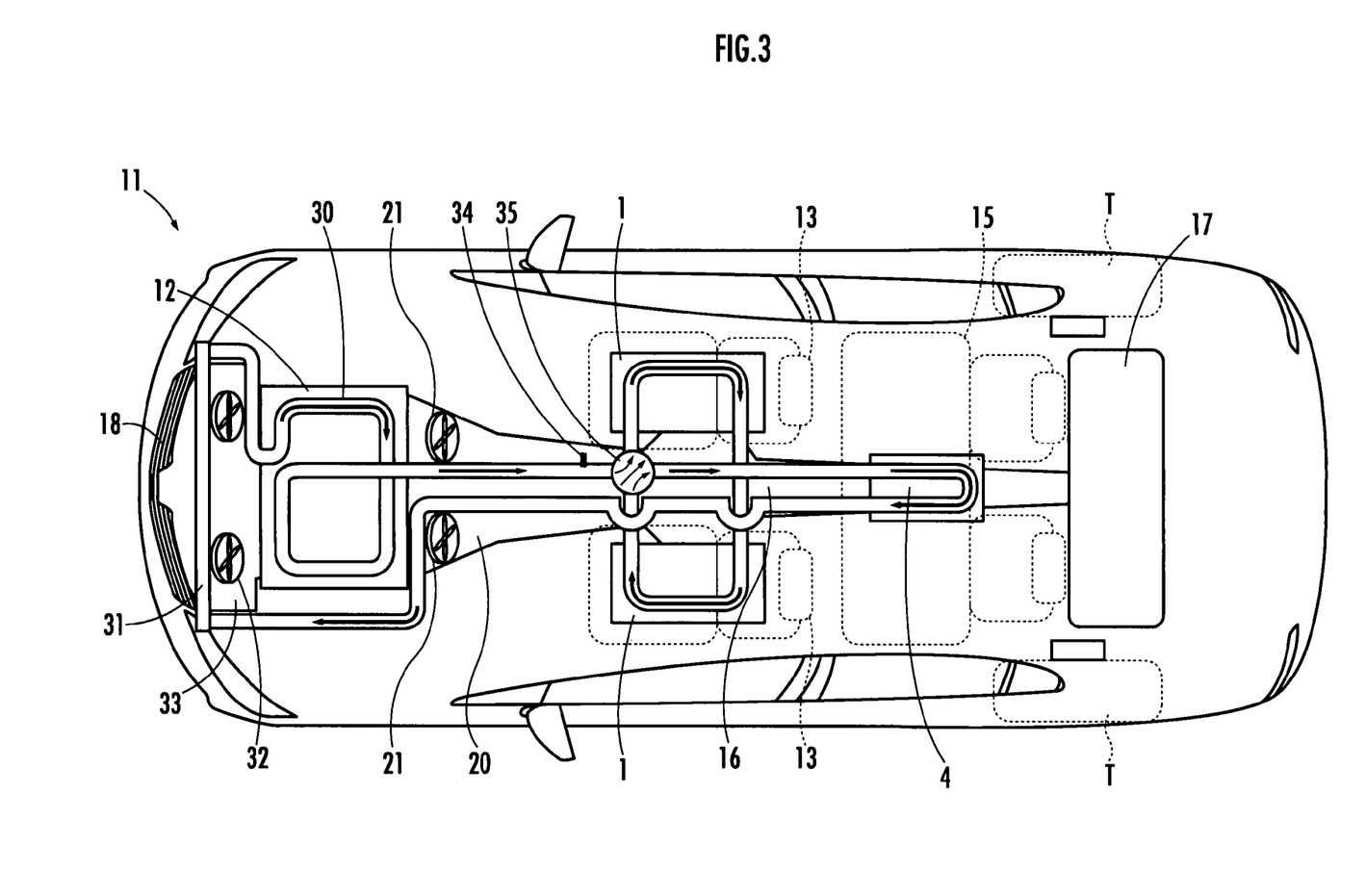
FIG. 3 is a partial sectional view of the fuel cell vehicle according to the embodiment viewed from above.

As shown in FIGS. 2 and 3, the accumulating unit 12 is arranged in a section equivalent to an engine room of the vehicle 11 from the front to the rear of the vehicle 11. A pair of the fuel cells 1 are arranged in a separated form between two front seats 13 and a vehicle lower frame 14 under the front seats 13. The PDU 4 is arranged in a section communicating with a center tunnel 16 between a rear seat 15 and the vehicle lower frame 14 under the rear seat 15. A hydrogen fuel tank 17 is arranged behind the back of the rear seat 15 behind the PDU 4. In rear wheels T of the vehicle 11, the motor 5 that uses the rear wheels T as driving wheels is provided.

The accumulating unit 12, the fuel cells 1, the PDU 4, and the hydrogen fuel tank 17 are arranged in an internal space 20 formed below an interior space of the vehicle 11. The internal space 20 is opened at one end thereof in a front grille 18 (equivalent to an inlet section of the present invention) of the vehicle 11 and communicates with the center tunnel 16 from the front grille 18 via the engine room. In other words, a part of the internal space 20 is configured by the center tunnel 16. The internal space 20 passes through a hydrogen fuel tank mounting area from the center tunnel 16 and is opened at the other end thereof to the outside behind the hydrogen fuel tank 17 through an outlet section 19 configured by a space in the lower frame 14, a space between the lower frame 14 and a body frame, and the like.

Consequently, the outdoor air corresponding to vehicle speed flows into the internal space 20 during running of the vehicle 11 and flows in the internal space 20. Therefore, it is possible to cool the component group including the accumulating unit 12, the fuel cells 1, the PDU 4, and the hydrogen fuel tank 17 at one time.

In the internal space 20, two circulating fans 21 are provided behind the accumulating unit 12. The circulating fans 21 forcibly circulate the inflow air serving as a cooling medium, which flows in from the front grille 18, to the center tunnel 16 side. Therefore, even when circulation in the internal space is small on a rear side of the vehicle 11 or the speed of the vehicle 11 is low and the inflow air is little, it is possible to prevent the inflow air from being held up in the internal space and always maintain certain cooling efficiency.

Heating generation amounts of the accumulating unit 12, the fuel cells 1, and the PDU 4 increase in this order. The upper limit operating temperature of the accumulating unit 12, the fuel cells 1, and the PDU 4 increases in this order, i.e., the upper limit operating temperature is equal to or lower than 60° C. (the upper limit operating temperature of the secondary battery 6) in the accumulating unit 12, equal to or lower than 90° C. in the fuel cells 1, and equal to or lower than 120° C. in the PDU 4. Therefore, it is possible to prevent inconvenience in that the inflow air is heated on the front side of the vehicle 11 and the heated components such as the PDU 4 arranged on the rear side cannot be cooled and to efficiently cool the component group.

The inflow air heated by the accumulating unit 12, the fuel cells 1, and the PDU 4 flows out to the outside passing through the hydrogen fuel tank 17 and members such as a regulator and various valves connected to the hydrogen fuel tank 17. Therefore, it is possible to heat the hydrogen fuel tank 17 and the members connected thereto and suppress a temperature fall in the hydrogen fuel tank 17 and the members. That is, in the hydrogen fuel tank 17, in general, temperature falls when a hydrogen gas is filled therein. Besides, temperature falls when the hydrogen gas is supplied because the supply of the hydrogen gas from the hydrogen fuel tank 17 (a hydrogen discharge reaction from a hydrogen occluded substance) is an endothermic reaction. However, by causing the heated inflow air to pass through the hydrogen fuel tank 17 section, it is possible to prevent the hydrogen fuel tank 17 and the members connected thereto from being frozen and prevent dew formation in the hydrogen fuel tank 17 and the members and thereby deterioration of the hydrogen fuel tank 17 and the members can be prevented. In other word, since the PDU 4 which is heated to the highest temperature and the hydrogen fuel tank 17 which is cooled to the lowest temperature among the components of the vehicle 11 are arranged adjacent to each other, it is possible to effectively adjust the cooling of the PDU 4 and the heating of the hydrogen fuel tank 17.

Moreover, as shown in FIG. 3, in the accumulating unit 12, the fuel cells 1, and the PDU 4, the circulation path 30 that annularly connects these components with a conduit is formed. Although the circulation path 30 is simplified in the figure, the circulation path 30 is appropriately plumbed to cool entire housings of the accumulating unit 12, the fuel cells 1, and the PDU 4 and heated sections.

In the circulation path 30, the conduit is filled with coolant (e.g., non-freezing ethylene glycol). The coolant is circulated in a direction of an arrow by a not-shown circulating pump. A radiator 31 is provided on a rear side of the front grille 18 on the circulation path 30. A part of the inflow air flowing in from the front grille 18 passes through the radiator, whereby the heated coolant is cooled. Fans 32 and a shielding plate 33 are provided behind the radiator 31. The fans 32 circulate the inflow air flowing in from the front grille 18 to the radiator 31 side and improve cooling efficiency of the radiator 31. The shielding plate 33 is provided inclining downward from an upper end of the radiator 31 and prevents the inflow air passing through the radiator 31 from flowing into a lead-in section side of the internal space 20.

In the circulation path 30, a temperature sensor 34 and a switching valve 35 are provided in a lead-in section to the fuel cells 1. The switching valve 35 is controlled by a not-shown controller on the basis of detected temperature by the temperature sensor 34. The switching valve 35 is a valve for switching a state in which the coolant in the circulation path 30 is circulated to the fuel cells 1 and a state in which the circulation is avoided. In the case shown in FIG. 3, the coolant in the circulation path 30 circulates to the fuel cells 1 and returns to the circulation path 30. When the switching valve 35 is turned a predetermined angle (−45° in the figure) in this state, an upstream side and a downstream side of the fuel cells 1 in the circulation path 30 are connected and the coolant is bypassed without flowing into the fuel cells 1.

Figure 4:
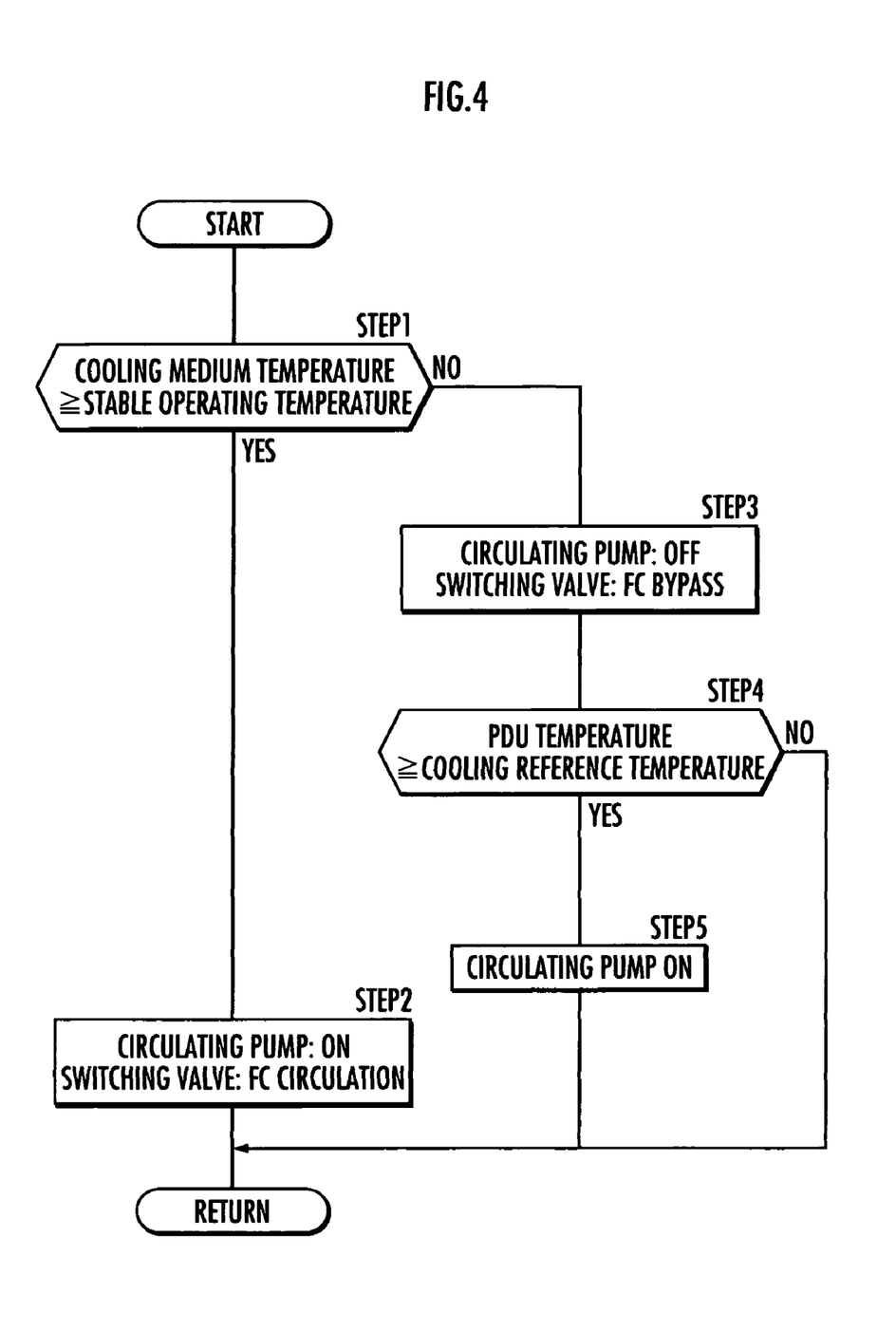
FIG. 4 is a flowchart showing processing by a controller.

Specific timing for control of the switching valve 35 by the controller and the like are explained with reference to FIG. 4. FIG. 4 is a flowchart showing processing by the controller. The controller executes the processing shown in FIG. 4 at a predetermined arithmetic processing period.

First, in a state in which a not-shown driving switch (an ignition switch) of the vehicle 11 is turned on by a driver (including a running state of the vehicle 11), the controller acquires measured temperature of the coolant measured by the temperature sensor 34 and judges whether the measured temperature of the coolant is equal to or higher than stable operating temperature (e.g., 25° C.) of the fuel cells 1 (STEP 1).

When the measured temperature of the coolant is equal to or higher than the stable operating temperature (YES in STEP 1), the controller turns on the circulating pump and, at the same time, switches the switching valve 35 to a state of circulation to the fuel cells 1 or, when the switching valve 35 is already in the circulation state, causes the switching valve 35 to maintain the circulation state (STEP 2).

Consequently, the coolant in the circulation path 30 circulates to the accumulating unit 12, the fuel cells 1, and the PDU 4 and cools these components. At this point, the coolant is cooled by the radiator 31 and then circulates to the accumulating unit 12, the fuel cells 1, and the PDU 4 in this order. Therefore, as in the case of the cooling by the inflow air explained above, the components are cooled in order from one having a smallest heating generation amount and thereby it is possible to prevent inconvenience in that the component arranged on the rear side cannot be cooled and to efficiently cool the component group.

Figure 5:
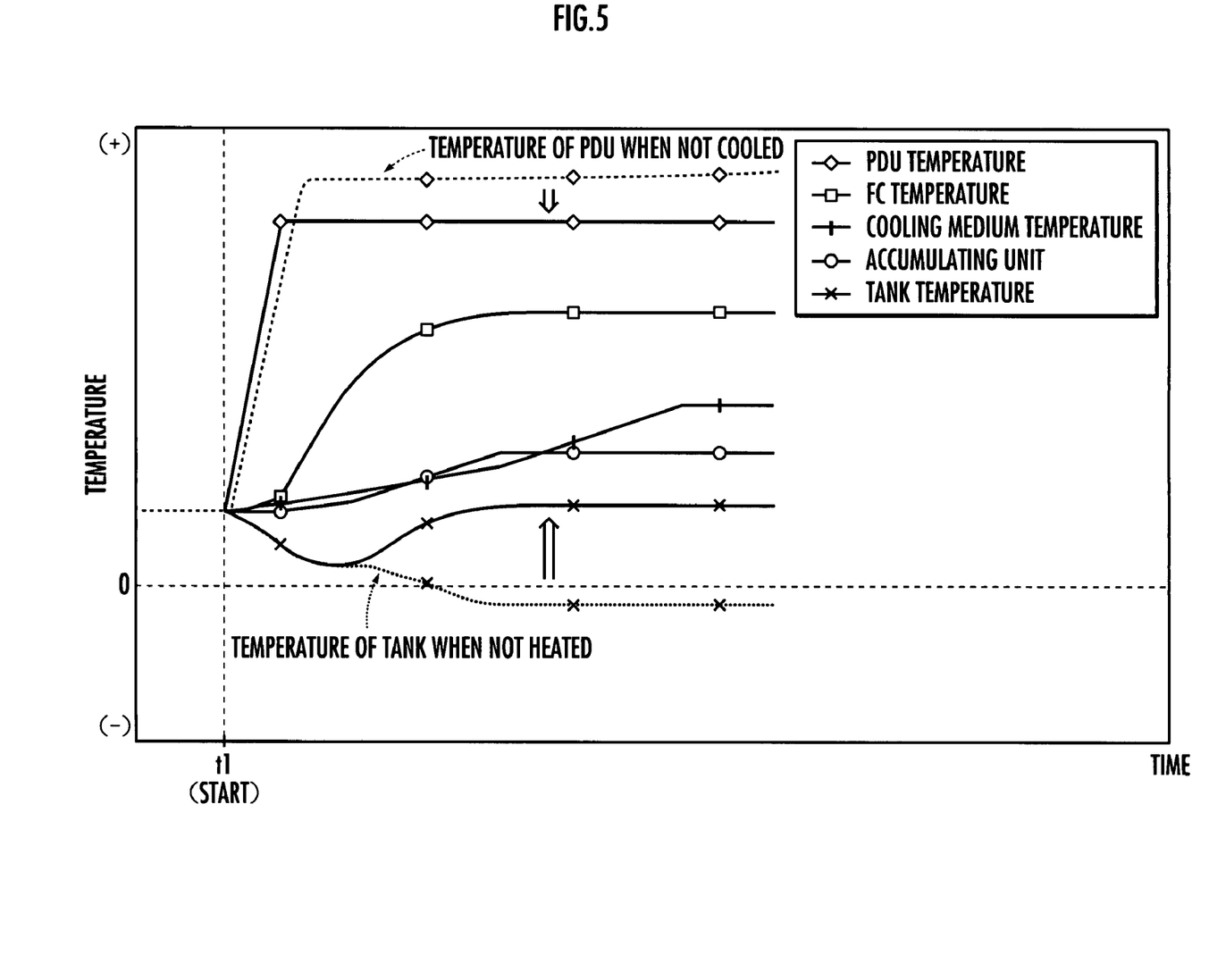
FIG. 5 is a graph showing temperature changes in components at the time when the vehicle is started at the ordinary temperature.

Temperature changes (cooling effects) in the respective components group are explained below with reference to FIG. 5. FIG. 5 is a graph showing temperature changes of the components after the start (the start of running) of the vehicle 11. The abscissa represents time and the ordinate represents the temperatures of the accumulating unit 12, the fuel cells 1, the PDU 4, the hydrogen fuel tank 17, and the coolant.

In FIG. 5, the vehicle 11 is started at the ordinary temperature (about 25° C.). When the vehicle 11 is started to run at time t1, according to STEPs 1 and 2 shown in FIG. 4, the circulating pump is turned on and the switching valve 35 changes to the state of circulation to the fuel cells 1.

The accumulating unit 12, the fuel cells 1, and the PDU 4 generate heat and the temperature thereof rises. Accordingly, the temperature of the coolant circulating among these components also rises. On the other hand, the temperature of the hydrogen fuel tank 17 falls according to the supply of the hydrogen gas to the fuel cells 1.

When cooling by the circulation of the inflow air and the coolant is performed with respect to the temperature change in the PDU 4, which is not cooled, indicated by a broken line in FIG. 5, the temperature rise in the PDU 4 is slightly moderate and the temperature in a stable state (a heat balance state) can be lowered.

In this case, the inflow air heated by the accumulating unit 12, the fuel cells 1, and the PDU 4 is supplied to the hydrogen fuel tank 17. Therefore, it is possible to prevent tank temperature from falling with respect to the tank temperature in the case where the tank is not heated, indicated by a broken line in FIG. 5 and always maintain the tank temperature at temperature higher than 0° C. Consequently, it is possible to stably supply the hydrogen gas from the hydrogen fuel tank 17 to the fuel cells 1. It is also possible to prevent freezing of the hydrogen fuel tank 17 and dew formation in the hydrogen fuel tank 17. In other words, since the PDU 4 heated to the highest temperature and the hydrogen fuel tank 17 cooled to the lowest temperature among the components of the vehicle 11 are arranged adjacent to each other, it is possible to effectively adjust the cooling of the PDU 4 and the heating of the hydrogen fuel tank 17.

Referring back to the flowchart shown in FIG. 4, processing performed when the measured temperature of the coolant is lower than the stable operating temperature of the fuel cells 1 is explained below.

When the measured temperature of the coolant is lower than the stable operating temperature (NO in STEP 1), the controller turns off the circulating pump (STEP 3). The controller switches the switching valve 35 to a bypass state in which circulation to the fuel cells 1 is prevented (STEP 3).

Following the processing in STEP 3, the controller judges whether temperature detected by the not-shown temperature sensor of the PDU 4 is equal to or higher than cooling reference temperature (STEP 4). The cooling reference temperature is temperature as a trigger for starting cooling of the PDU 4.

When the detected temperature of the PDU 4 is equal to or higher than the cooling reference temperature (YES in STEP 4), the controller turns on the circulating pump while maintaining the switching valve 35 in the bypass state (STEP 5). On the other hand, when the detected temperature of the PDU 4 is lower than the cooling reference temperature (NO in STEP 4), the controller maintains the switching valve 35 in the bypass state while keeping the circulating pump off.

Figure 6:
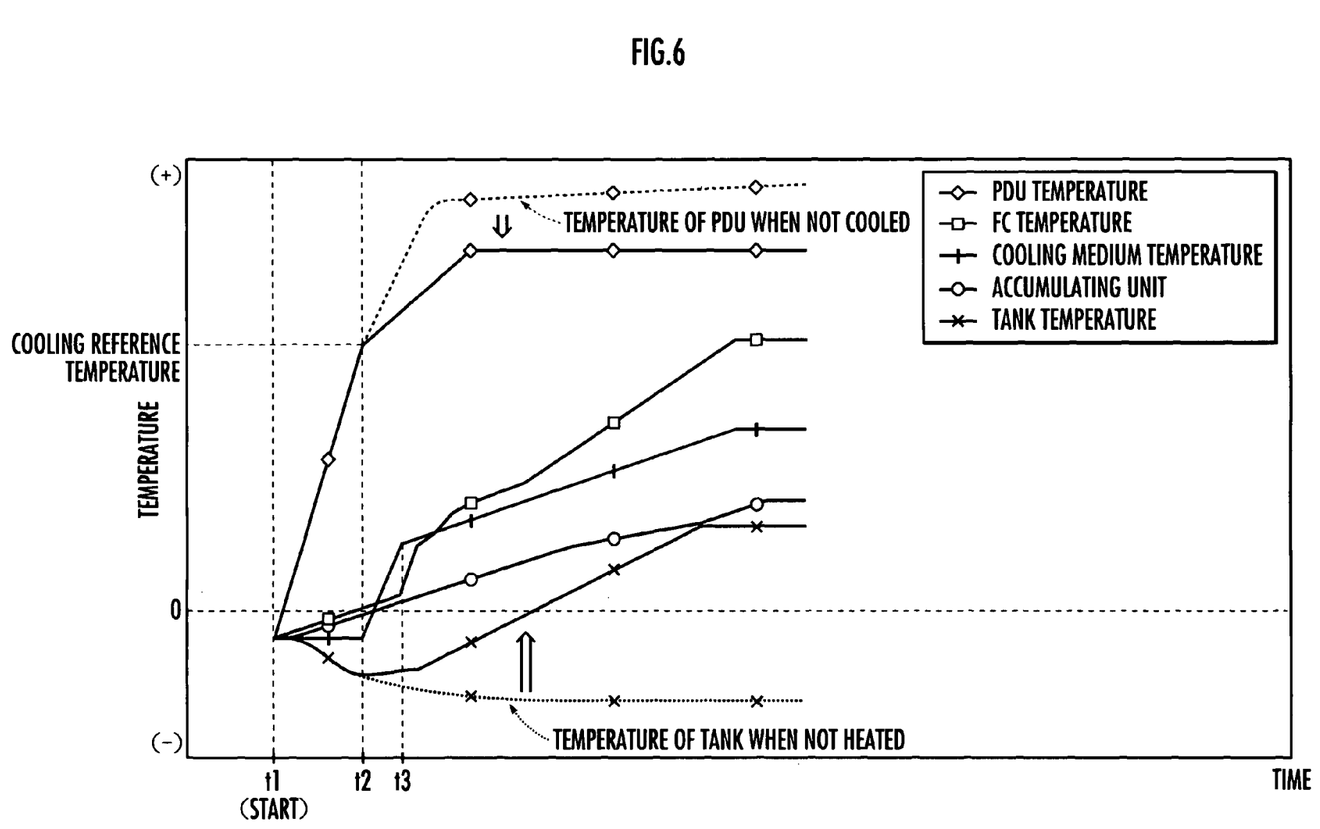
FIG. 6 is a graph showing temperature changes in the components at the time when the vehicle is started at sub-zero temperature.

Temperature changes (cooling effects) of the respective component group in this case are explained below with reference to FIG. 6. FIG. 6 is a graph showing temperature changes of the respective components after the start (the start of running) of the vehicle 11. The abscissa represents time and the ordinate represents the temperatures of the accumulating unit 12, the fuel cell 1s, the PDU 4, the hydrogen fuel tank 17, and the coolant.

In FIG. 6, the vehicle 11 is started at sub-zero temperature (approximately −10° C.). When the vehicle is turned on and started to run at time t1, the processing according to STEPs 3 to 5 shown in FIG. 4 is executed by the controller.

First, at time t1 to t2 shown in FIG. 6, the temperature of the components heated by the start of the vehicle 11 rises. The temperature of the coolant is maintained at initial temperature because, even if the vehicle 11 is started, the circulating pump is kept off until time t2 when the detected temperature of the PDU 4 reaches the cooling reference temperature (STEP 3). The temperature of the hydrogen fuel tank 17 falls according to the supply of the hydrogen gas.

When the detected temperature of the PDU 4 reaches the cooling reference temperature at time t2 (STEP 4), the controller turns on the circulating pump (STEP 5). The coolant is heated by the PDU 4 and the accumulating unit 12. Consequently, between time t2 to t3, the temperature of the coolant rises and the inclination of the temperature rise in the detected temperature of the PDU 4 is moderate.

When the temperature of the coolant reaches the stable operating temperature of the fuel cells 1 at time t3 (YES in STEP 1), the switching valve 35 changes to the state of circulation to the fuel cells 1 (STEP 2). Consequently, immediately after time t3, the temperature of the fuel cells 1 rapidly rises to the stable operating temperature.

In this way, when the temperature of the coolant is lower than the stable operating temperature of the fuel cells 1, it is possible to prevent the coolant from circulating to the fuel cells 1. It is possible to raise the temperature of the coolant to be equal to or higher than the stable operating temperature of the fuel cells 1 by actuating the circulating pump according to the detected temperature of the PDU 4 while maintaining the switching valve 35 in the bypass state and thereby it is possible to heat the fuel cells 1 by circulating the coolant heated to the temperature equal to or higher than the stable operating temperature to the fuel cells 1.

After time t3, as in the case of the start at the ordinary temperature shown in FIG. 5, it is possible to lower the temperature in the stable state (the heat balance state) with respect to a temperature change in the PDU 4, when cooling indicated by a broken line in FIG. 6 is not performed. The inflow air heated by the accumulating unit 12, the fuel cells 1, and the PDU 4 is supplied to the hydrogen fuel tank 17 and thereby it is possible to prevent tank temperature from falling with respect to the tank temperature of the hydrogen fuel tank 17 when heating indicated by a broken line in FIG. 6 is not performed and always maintain the tank temperature at temperature higher than 0° C. Consequently, the tank temperature can be maintained at temperature equal to or higher than freezing temperature and, more preferably, a dew point (a dew formation point).

In this embodiment, both the capacitor 2 and the secondary battery 6 are used as the accumulating means. However, the present invention is not limited to this. One of the capacitor 2 and the secondary battery 6 may be used as the accumulating means. In this embodiment, the accumulating unit 12 including the capacitor 2 and the secondary battery 6 is cooled as one body. However, it is preferable to separately and independently arrange the capacitor 2 and the secondary battery 6 and cool the capacitor 2 having a smaller heating generation amount first.

In this embodiment, the heat radiating unit is configured by the radiator 31. However, the present invention is not limited to this. The circulation path 30 may circulate through the hydrogen fuel tank 17 as well after circulating through the PDU 4. The heat radiating unit may be configured by a circulation path section that circulates through the hydrogen fuel tank 17. Moreover, a part of the circulation path 30 may be exposed to the outside of the vehicle 11 to configure the heat radiating unit with the exposed part.

In this embodiment, a four-wheeled vehicle is explained as an example of the vehicle. However, the vehicle is not limited to this and may be a motorcycle, a railway vehicle, and the like.

In this embodiment, the switching valve 35 is provided in the lead-in section to the fuel cells 1 on the circulation path 30. However, the present invention is not limited to this. Switching valves may be provided in lead-in sections to the components connected to the circulation path 30 to control the supply of coolant to the components. In this case, it is preferable to provide temperature sensors for detecting the temperature of the coolant in the lead-in sections to the components, judge whether or not the temperature of the coolant is suitable for the components, and control the supply of the coolant on the basis of a result of the judgment.

What is claimed is:

1. A vehicle mounted with a fuel cell power supply system, comprising at least:
    a fuel cell;
    accumulating means comprising one or both of a capacitor and a secondary battery connected to the fuel cell;
    a motor serving as a power source for the vehicle to which output sections of the fuel cell and the accumulating means are connected; and
    a motor driving device provided between the output sections and the motor, wherein
    a first component group, comprising the fuel cell, the accumulating means, and the motor driving device, is configured to be cooled by a cooling medium, which flows in a single cooling flow passage inside the vehicle, in an order from one having a lowest heating generation amount to the one having a highest heating generation amount.

2. The vehicle according to claim 1, wherein a second component group comprising a fuel tank to supply fuel to the fuel cell is arranged downstream of the first component group in the flow of the cooling medium.

3. The vehicle according to claim 1, wherein
the cooling medium is air flowing in an internal space in which the first component group is arranged, and
the internal space includes an inlet section to cause air outside the vehicle to flow into the internal space when the vehicle runs and an outlet section to cause the inflow air to flow out of the internal space.

4. The vehicle according to claim 3, wherein a second component group comprising a fuel tank to supply fuel to the fuel cell is arranged between the internal space and the outlet section.

5. The vehicle according to claim 1, wherein
the cooling medium is coolant flowing through a circulation path provided in the vehicle, and
in the circulation path, a heat radiating unit that radiates heat of the coolant is provided on a path leading from the component having a maximum heating generation amount to the component having a minimum heating generation amount.

6. The vehicle according to claim 5, wherein the heat radiating unit includes a circulation path section, which circulates through the second component group comprising a fuel tank to supply fuel to the fuel cell.

7. The vehicle according to claim 5, wherein a temperature sensor configured to measure the temperature of the coolant and a switching valve configured to switch an object to be cooled by the coolant to all or a part of the component group are provided in the circulation path, and
the switching valve is switched on the basis of measured temperature by the temperature sensor.

8. The vehicle according to claim 1, wherein the fuel cell, the accumulating means, and the motor driving device are cooled in order of the accumulating means, the fuel cell, and the motor driving device by the cooling medium.

* * * * *